(12) United States Patent
Hong

(10) Patent No.: US 6,803,966 B2
(45) Date of Patent: Oct. 12, 2004

(54) DIGITAL TV RECEIVER AND METHOD FOR RECEIVING DIGITAL TV SIGNAL

(76) Inventor: Sung Ryong Hong, Cheolsolmaeul 904-1301, Kumgok-dong, Pundang-gu, Songnam-shi, Kyonggi-do (KR)

( * ) Notice: Subject to any disclaimer, the term of this patent is extended or adjusted under 35 U.S.C. 154(b) by 476 days.

(21) Appl. No.: 10/044,878

(22) Filed: Oct. 19, 2001

(65) Prior Publication Data

US 2002/0145680 A1 Oct. 10, 2002

(30) Foreign Application Priority Data

Oct. 20, 2000 (KR) .......................................... 2000-61883

(51) Int. Cl.[7] .......................... H04N 5/04; H04N 5/455; H03C 1/52
(52) U.S. Cl. ...................... 348/500; 348/521; 348/537; 375/321; 375/316
(58) Field of Search ................................ 348/500, 508, 348/516, 517, 521, 525, 726, 725, 475, 476, 537; 375/321, 277, 231, 324, 327, 355, 316, 376, 229, 350

(56) References Cited

U.S. PATENT DOCUMENTS

| | | | | |
|---|---|---|---|---|
| 5,588,025 A | * | 12/1996 | Strolle et al. ................ | 375/316 |
| 5,673,293 A | * | 9/1997 | Scarpa et al. ................ | 375/321 |
| 6,175,391 B1 | * | 1/2001 | Kwak .......................... | 348/725 |
| 6,198,780 B1 | * | 3/2001 | Kang .......................... | 375/321 |
| 6,385,237 B1 | * | 5/2002 | Tsui et al. ................... | 375/228 |
| 6,493,409 B1 | * | 12/2002 | Lin et al. ..................... | 375/375 |
| 6,504,578 B1 | * | 1/2003 | Gu ............................. | 348/521 |
| 6,573,940 B1 | * | 6/2003 | Yang .......................... | 348/441 |
| 6,583,822 B1 | * | 6/2003 | Jun ............................ | 348/537 |
| 6,671,334 B1 | * | 12/2003 | Kuntz et al. ................ | 375/340 |

* cited by examiner

Primary Examiner—Michael H. Lee
Assistant Examiner—Paulos Natnael
(74) Attorney, Agent, or Firm—Lee, Hong, Degerman, Kang & Schmadeka

(57) ABSTRACT

A digital TV receiver and a method for receiving a digital TV signal are disclosed, in which timing recovery and segment synchronizing signal recovery are independently implemented and VSB demodulation is digitally implemented. The digital TV receiver includes: an A/D converter and demodulator converting VSB modulated signals to digital signals and demodulating the digital signals in a VSB mode; a resampler performing interpolation to reduce errors between the signals digitalized by the A/D converter and demodulator using a timing error of current symbols; a timing recovery unit obtaining the timing error of the current symbols from the output of the resampler and outputting again the obtained timing error to the resampler; an equalizer equalizing a signal included in the output of the resampler using segment and field synchronizing signals as training signals; and a synchronizing recovery unit recovering the segment and field synchronizing signals from the output of the equalizer and outputting again the recovered synchronizing signals to the equalizer.

14 Claims, 5 Drawing Sheets

DIGITAL TV RECEIVER AND METHOD FOR RECEIVING DIGITAL TV SIGNAL

BACKGROUND OF THE INVENTION

1. Field of the Invention

The present invention relates to a digital TV receiver that receives a vestigial side band (VSB) signal and demodulates it, and more particularly, to a digital TV receiver and a method for receiving a digital TV signal, in which a symbol clock and a synchronizing signal are recovered from received data.

2. Background of the Related Art

Generally, a VSB transmission system of a Grand Alliance adopted as a standard of a digital TV transmission mode in USA and Korea modulates one side band signal of two side bands generated up and down around a carrier wave when the other side band signal is attenuated. That is, the VSB transmission system transmits one side band spectrum of a base band to a pass band to efficiently use a band region.

The VSB transmission system is more remarkable than other digital TV transmission systems in that it includes a pilot signal, a data segment synchronizing signal, and a field synchronizing signal. These signals can be used to improve carrier recovery characteristic and timing recovery characteristic. The recovery characteristic of the synchronizing signals greatly act on performance of the overall VSB system.

A transmitting party such as a broadcasting station transmits a signal through a mapper that acts to convert the signal to a desired power level. As an example, in case of 8 VSB for terrestrial broadcasting, an output level of the mapper is one of eight symbol values (amplitude level), −168, −120, −72, −24, 24, 72, 120, and 168. The mapper forcibly inserts a segment synchronizing signal of four symbols for each unit of 828 symbols by a protocol and forcibly inserts a field synchronizing signal into a 313rd data segment location.

At this time, the protocol of the segment synchronizing signal has a logic format of 1, 0, 0, and 1. The output level of the mapper is 120 when the synchronizing signal is 1 while the output level is −120 when the synchronizing signal is 0. That is, the segment synchronizing signal is repeated with two levels per data segment.

FIG. 1 shows a VSB data frame format including the data and the synchronizing signal. Referring to FIG. 1, one frame includes two fields while one filed includes 313 data segments. One data segment includes 832 symbols. In this case, first four symbols in one data segment correspond to a segment synchronizing portion, and the first data segment in one field corresponds to a field synchronizing portion.

FIG. 2 shows a configuration of the field synchronizing portion.

Referring to FIG. 2, a data segment synchronization of four symbols, a PN511 sequence which is a pseudo random sequence, three PN63 sequences, and VSB mode information of 24 symbols are provided, while other 014 symbols are reserved. In other words, the PN511 sequence includes 511 pseudo random symbols. The second PN63 sequence of the PN63 sequences has an inverted symbol configuration per field, wherein '1' is inverted to '0' while '0' is inverted to '1'. Accordingly, one field may be divided into an even field and an odd field depending on polarity of the second PN63 sequence.

FIG. 3 is a block diagram illustrating a general digital TV receiver that receives and recovers the synchronizing signal.

Referring to FIG. 3, if a radio frequency (RF) signal modulated in a VSB mode is received through an antenna 101, a tuner 102 selects a user's desired special channel frequency. Then, the tuner 102 acts to transit a VSB signal of an RF band loaded in the channel frequency to a primary fixed intermediate frequency (IF) band of 44 MHz or 43.75 MHz and to filter other channel signals.

An output signal of the tuner 102 that acts to transit an arbitrary channel spectrum to the primary fixed IF band passes through a surface acoustic wave (SAW) filter 103 adapted to remove an adjacent channel signal and a noise signal.

At this time, since all information exist in a band of 6 MHz from the IF of 44 MHz, the SAW filter 103 removes all periods except for the band of 6 MHz with information from the output of the tuner 102 and then outputs a digital broadcasting signal to the down converter 104.

The down converter 104 performs down conversion of the signal filtered by the SAW filter 103 with an oscillation frequency for generating a second IF signal and outputs the converted second IF signal to a demodulator 105.

The demodulator 105 demodulates a VSB modulated signal in an analog mode and outputs the demodulated signal to an A/D converter 106.

The A/D converter 106 converts the VSB demodulated signal to a digital signal in accordance with an A/D clock provided from a timing recovery unit 107 and outputs the digital signal to the timing recovery unit 107, a synchronizing signal recovery unit 108, and an equalizer 109.

In this case, a VSB transmission system of an advanced television systems committee (ATSC) suggested by a US digital TV mode transmits a transmitting signal which includes data only.

Therefore, to recover the data in a receiving party shown in FIG. 3, the same clock as that used during transmission should be generated. The timing recovery unit 107 acts to generate the clock. In the currently suggested ATSC standard, the receiving party performs timing recovery using a data segment synchronizing signal regularly inserted from the transmission party.

Namely, the timing recovery unit 107 obtains a symbol timing error, which will be used as an A/D clock (A/D clk) of the A/D converter 106, using the segment synchronizing signal detected by the synchronizing detector 108.

The segment synchronizing signal is used to determine a start position of a segment and at the same time to recover timing of the system. Accordingly, the synchronizing recovery unit 108 detects a segment synchronizing signal and outputs the detected segment synchronizing signal to the timing recovery unit 107 and the equalizer 109. The timing recovery unit 107 performs timing recovery using the segment synchronizing signal. The synchronizing recovery unit 108 recovers the field synchronizing signal using the detected segment synchronizing signal and outputs the recovered field synchronizing signal to the equalizer 109.

However, since the segment synchronizing signal consists of four symbols 1001, it may be difficult to be detected due to a damaged channel having a large sized ghost even if it is repeated per segment. Particularly, under a ghost channel environment in which a serious null is generated around the segment synchronizing signal, it is more difficult to detect the segment synchronizing signal. Generally, in a downtown area where big buildings are located, or in an area where a VSB terrestrial broadcasting is received through an indoor antenna, it is well known that a serious near-by ghost signal is generated.

Therefore, if the segment synchronizing signal is not detected for the above reasons, timing recovery and field synchronizing signal detection are not implemented. In this case, data recovery may be delayed or may not be implemented as the overall systems as well as a channel equalizer do not work.

In other words, if the synchronizing detecting unit 108 does not detect the segment synchronizing signal, the timing recovery unit 107 cannot recover timing data. Since the timing data is provided to the A/D clock of the A/D converter 106, the segment synchronizing signal cannot be detected unless the timing data is recovered. Moreover, since the structure of FIG. 3 has many analog components, it is difficult to control the components.

SUMMARY OF THE INVENTION

Accordingly, the present invention is directed to a digital TV receiver and a method for receiving a digital TV signal that substantially obviate one or more problems due to limitations and disadvantages of the related art.

An object of the present invention is to provide a digital TV receiver and a method for receiving a digital TV signal, in which timing recovery and segment synchronizing signal recovery are independently implemented.

Another object of the present invention is to provide a digital TV receiver and a method for receiving a digital TV signal, in which VSB demodulation is digitally implemented.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital TV receiver according to the present invention includes: an A/D converter and demodulator converting VSB modulated signals to digital signals and demodulating the digital signals in a VSB mode; a resampler performing interpolation to reduce errors between the signals digitalized by the A/D converter and demodulator using a timing error of current symbols; a timing recovery unit obtaining the timing error of the current symbols from the output of the resampler and outputting again the obtained timing error to the resampler; an equalizer equalizing a signal included in the output of the resampler using segment and field synchronizing signals as training signals; and a synchronizing recovery unit recovering the segment and field synchronizing signals from the output of the equalizer and outputting again the recovered synchronizing signals to the equalizer.

The timing recovery unit includes a pre-filter that passes through a spectrum edge portion only from the output of the resampler, a timing error detector that detects timing error data using the signs of the two symbol samples and one intermediate sample that have passed through the pre-filter, a loop filter that passes through low band signal components only among the timing error data extracted from the timing error detector, and a numerically controlled oscillator (NCO) that controls a sampling timing of the resampler by converting the output frequency in accordance with the low band components of the timing error data.

The synchronizing recovery unit includes a correlation unit obtaining a correlation value between the received signal and a preset synchronizing signal, a maximum value position detector outputting a position value of a symbol having a maximum correlation value per field, a synchronizing lock signal generator checking reliability of the position value of the symbol detected by the maximum value position detector to generate a synchronizing lock signal, and a synchronizing signal detector detecting a segment synchronizing signal and a field synchronizing signal by obtaining a relative position value of the position value of the symbol having the maximum correlation value if the synchronizing lock signal is generated by the synchronizing lock signal generator.

In the present invention, timing recovery and segment synchronizing signal recovery are independently implemented, and VSB demodulation is implemented in a digital mode. This simplifies the system and improves stability and performance of the system, thereby allowing timing recovery and synchronizing signal recovery to be recovered on a channel to which a serious near-by ghost is applied.

In another aspect, a method for receiving a digital TV signal according to the present invention includes the steps of: a) converting VSB modulated signals to digital signals and demodulating the digital signals in a VSB mode; b) performing interpolation to reduce errors between the signals digitalized in the step a) using a timing error of current symbols; c) obtaining the timing error of the current symbols from the output of the step b) and outputting again the obtained timing error to the step b); d) equalizing a signal included in the output of the step b) using segment and field synchronizing signals as training signals; and e) recovering the segment and field synchronizing signals from the output of the step d) and outputting again the recovered synchronizing signals to the step d).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 7a and 7b illustrate performance of a symbol timing recovery unit through computer simulation, wherein FIG. 7a illustrates convergence characteristic in a state where no ghost is applied, and FIG. 7b illustrates convergence characteristic in a state where a serious near-by ghost of 1 dB that causes a null at the spectrum edge is applied.

DETAILED DESCRIPTION OF THE INVENTION

Reference will now be made in detail to the preferred embodiments of the present invention, examples of which are illustrated in the accompanying drawings.

Figure 1:
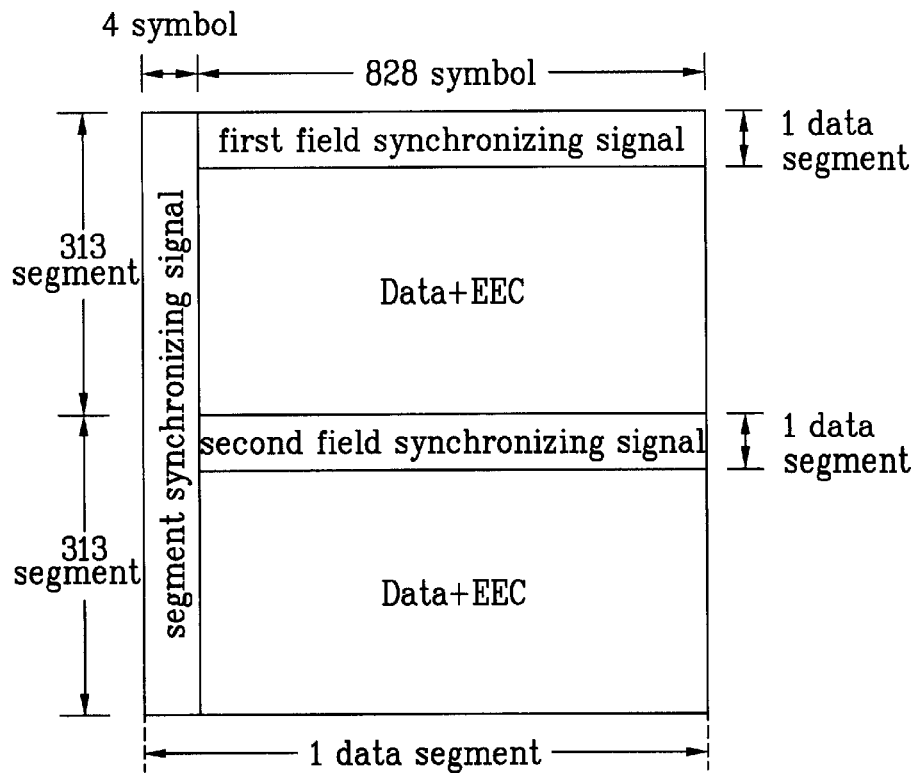
FIG. 1 illustrates a data frame structure of a general digital TV.
Figure 2:
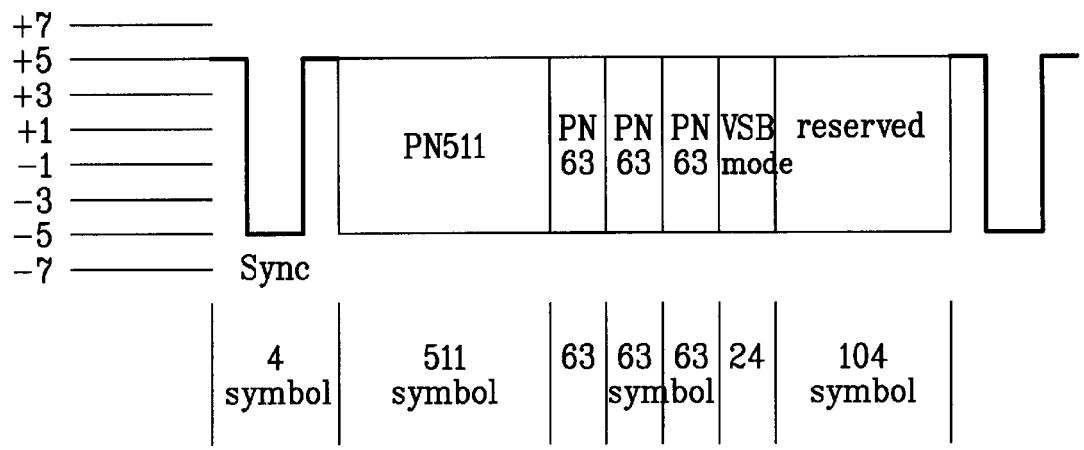
FIG. 2 illustrates a structure of a field synchronizing signal of FIG. 1.
Figure 3:
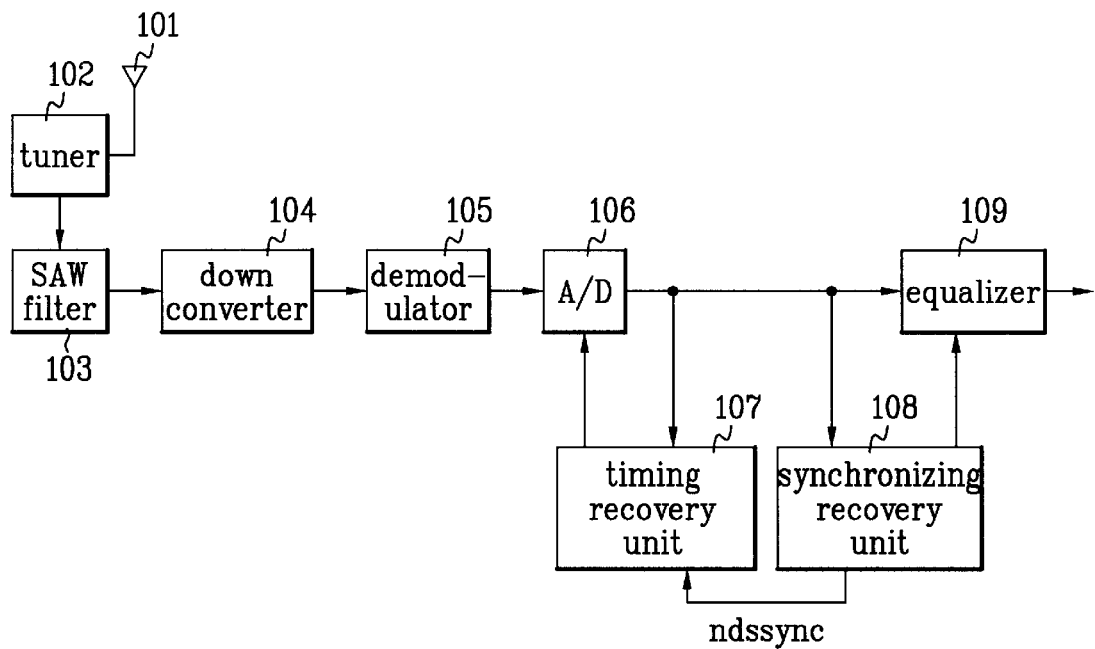
FIG. 3 is a block diagram illustrating a general digital TV receiver.
Figure 4:
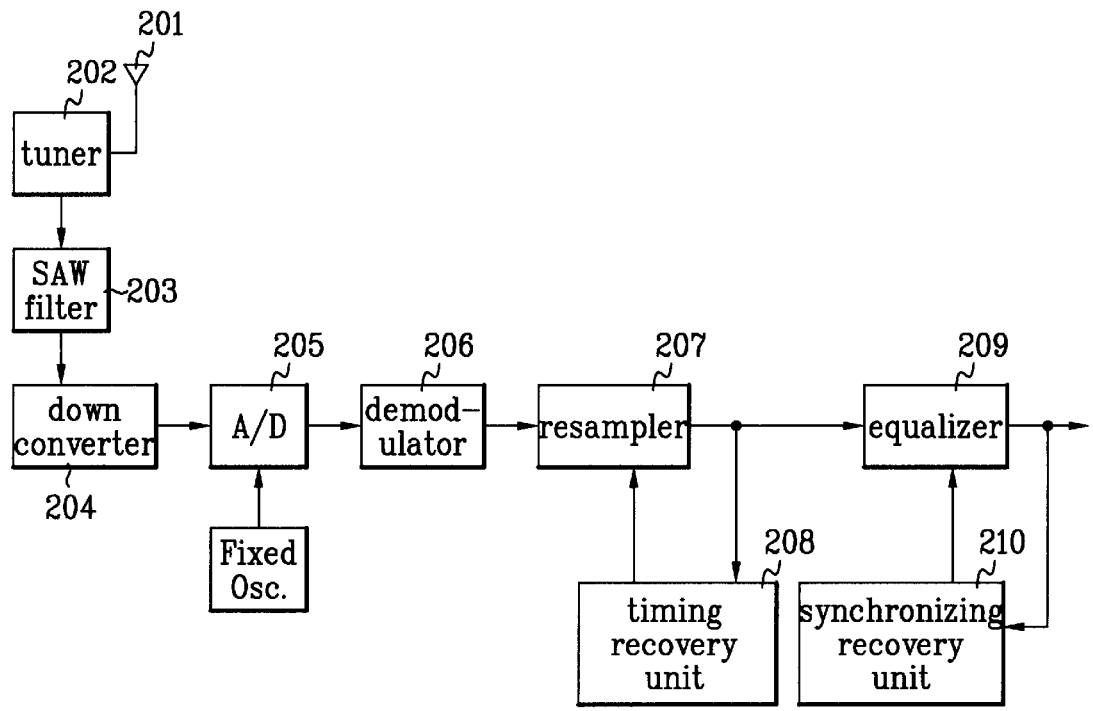
FIG. 4 is a block diagram illustrating a digital TV receiver according to the present invention.

FIG. 4 is a block diagram illustrating a digital TV receiver according to the present invention.

Referring to FIG. 4, an antenna 201, a tuner 202, a SAW filter 203, and a down converter 204 are processed in an analog mode while an A/D converter 205, a VSB demodulator 206, a resampling unit 207, a timing recovery unit 208, an equalizer 209, and a synchronizing recovery unit 210 are processed in a digital mode.

In more detail, the VSB demodulator 206 digitally demodulates a VSB signal, and the timing recovery unit 208 implements timing recovery using only the output of the resampling unit 207. Also, the synchronizing signal recovery unit 210 recovers a segment synchronizing signal and a field synchronizing signal from the output of the equalizer 209 and outputs them to the equalizer 209. In this case, the segment synchronizing signal recovered by the synchronizing recovery unit 210 is not output to the timing recovery unit 208.

In the aforementioned digital TV receiver of the present invention, if an RF signal demodulated in a VSB mode is received through an antenna 201, the tuner 202 selects a user's desired special channel frequency and then transits a VSB signal of an RF band loaded in the channel frequency to a primary fixed IF band. The tuner 202 properly filters other channel signals and outputs them to the SAW filter 203.

The SAW filter 203 removes all periods except for the band of 6 MHz with information from the output of the tuner 202 and then outputs a digital broadcasting signal to the down converter 204. The down converter 204 down-converts a signal filtered by the SAW filter 203 with the oscillation frequency for generating a second IF signal, to a second IF signal. Then, the down converter 204 outputs the converted second IF signal to the A/D converter 205.

The A/D converter 205 samples the output of the down converter 204 with a fixed frequency of 25 MHz, converts the sampled value to a digital signal, and outputs the converted value to the demodulator 206. The demodulator 206 demodulates the signal digitalized by the A/D converter 205 in a VSB mode and outputs the demodulated signal to the resampler 207 for conversion to a signal recovered in a symbol type.

The resampler 207 receives timing error of current symbols output through signal processing of a base band from the timing recovery unit 208 and performs interpolation to reduce error between the digitalized signals. That is, the digital signal of 6 MHz sampled at 25 MHz is interpolated by n times of a real symbol ratio through the resampler 207 (for example, n=2).

The output of the resampler 207 is output to the timing recovery unit 208 and the equalizer 209.

Figure 5:
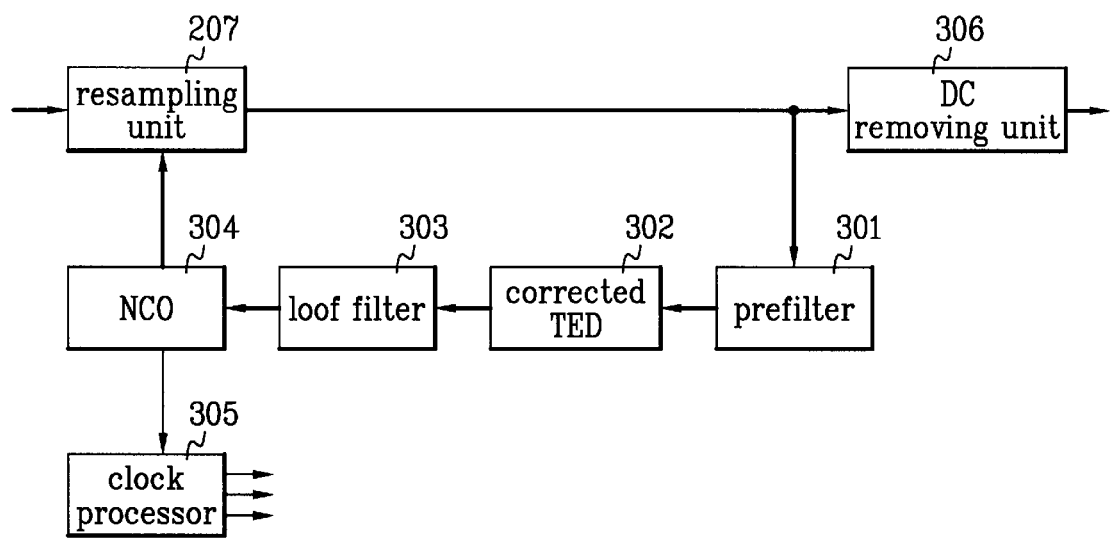
FIG. 5 is a detailed block diagram illustrating a timing recovery unit of FIG. 4.

FIG. 5 is a detailed block diagram of the timing recovery unit 208. Referring to FIG. 5, the timing recovery unit 208 includes a pre-filter 301 that passes through a certain band only from the output of the resampler 207, a timing error detector 302 that obtains a timing error by taking a symbol only from the output of the pre-filter 301, a loop filter 303 that passes through low band signal components among data of the timing error, a numerically controlled oscillator (NCO) 304 that controls a sampling timing of the resampler 207 by converting the output frequency in accordance with the low band components of the timing error, and a DC controller 306 that removes DC from the output of the resampler 207 and outputs the signal from which DC is removed to the equalizer 208. A reference numeral 305 which is not described represents a clock processor that generates clocks required for the respective elements using the output of the NCO 304.

Generally, when a near-by ghost is applied, the symbol timing recovery unit 208 and the synchronizing signal recovery unit 209 of the VSB digital TV receiver are what they are most likely to be susceptible to the near-by ghost.

Therefore, the symbol timing recovery unit 208 of the present invention adopts an algorithm that can be operation in a blind mode. The blind mode means that two-level slicing, four-level slicing, and eight-level slicing are sequentially performed at a certain time interval. At this time, the timing recovery unit 208 is operated through the received data regardless of the segment synchronizing signal.

To this end, in the present invention, the timing error detector 302 has been realized by modifying "Gardner method'. In this case, it is not necessary to detect the segment synchronizing signal for timing recovery. Namely, for system timing recovery, the Gardner method uses not the segment synchronizing signal but a general data symbol. The Gardner method uses two symbol samples and one intermediate sample as expressed by the following equation (1).

$$U_\tau(k) = x\left(\tau - \frac{T}{2} + kT\right)\{x(\tau + kT) - x(\tau - T + kT)\} \quad (1)$$

Wherein, $\tau$ is a timing phase, $x(\tau+kT)$ and $x(\tau-T+kT)$ are symbol samples, and $$x\left(\tau - \frac{T}{2} + kT\right)$$

is an intermediate sample.

Generally, the Gardner method in the equation (1) has excellent capture and trace performances and also has a small timing jitter. However, the Gardner method is vulnerable when a ghost having a small roll-off and a serious null in a spectrum edge is applied.

Therefore, in the present invention, the Gardner method has been modified to stably recover symbol timing. In other words, the timing error detector 302 obtains timing error data through the modified Gardner method that takes a binary slicer in two symbol samples of the equation (1).

At this time, if the two symbol samples pass through the binary slicer, only values corresponding to signs of the two symbol samples are output. Accordingly, the timing error data of the present invention is obtained by multiplying an intermediate sample value by a difference value between the signs of the two symbol samples that have passed through the binary slicer.

In a typical eight VSB system, a received value is sliced at eight levels. However, in the present invention, a received value is sliced at two levels using only the signs of the symbols samples. Accordingly, even in case that a ghost or error is inserted into the received signal, exact slicing can be carried out.

In addition, in a transmission system having a small roll-off, for application of the modified Gardner system, a band pass filter that filters the spectrum edge is arranged between the resampler 207 and the timing error detector 302. In the present invention, the band pass filter is designated as the pre-filter 301. This is because that the timing data exists in the spectrum edge.

In other words, the output of the resampler 207 is input to the pre-filter 301. The pre-filter 301 passes through the spectrum edge that can obtain timing data, and outputs a value of the spectrum edge to the timing error detector 302. At this time, as the output of the resampler 207 passes through the pre-filter 301, the system of the present invention can be applied to the transmission system with small roll-off and effect by white noise can be reduced, thereby reducing timing jitter.

The timing error detector 302 extracts timing error data by applying the symbol samples that have passed through the pre-filter 301 to the following equation (2). At this time, the timing error detector 302 uses only the signs of the two symbol samples. In other words, the timing error data is obtained as shown in the equation (2) by multiplying an intermediate sample value by a difference value between the signs of the two symbol samples that have passed through the binary slicer.

$$U_\tau(k) = x\left(\tau - \frac{T}{2} + kT\right)\{x(\tau + kT) - x(\tau - T + kT)\} \quad (2)$$

Wherein, τ is a timing phase, x(τ+kT) and x(τ−T+kT) are signs of symbol samples, and $$x\left(\tau - \frac{T}{2} + kT\right)$$

is an intermediate sample.

The loop filter 303 filters low band signal components among the timing error data extracted from the timing error detector 302 and outputs the filtered value to the NCO 304. The NCO 304 controls a sampling timing of the resampler 207 by converting the output frequency in accordance with the low band components of the timing error data.

By obtaining the timing error using pre-filter 301 and the timing error detector 302 of the modified Gardner method, stable symbol timing recovery is made even on a channel having a ghost size corresponding to 90%(0.5 dB) of a main signal. Also, such performance improvement of the symbol timing recovery unit improves performance of the overall receiver system.

Meanwhile, the symbol timing recovery unit 208 suggested in the present invention can adapt to gear shifting, which can more improve timing jitter characteristic.

Figure 7A:
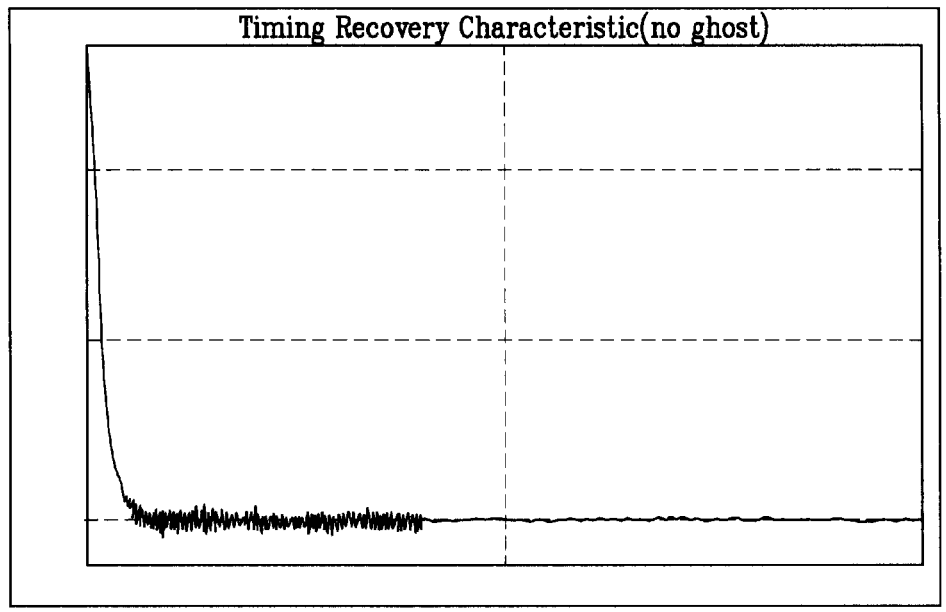
Figure 7B:
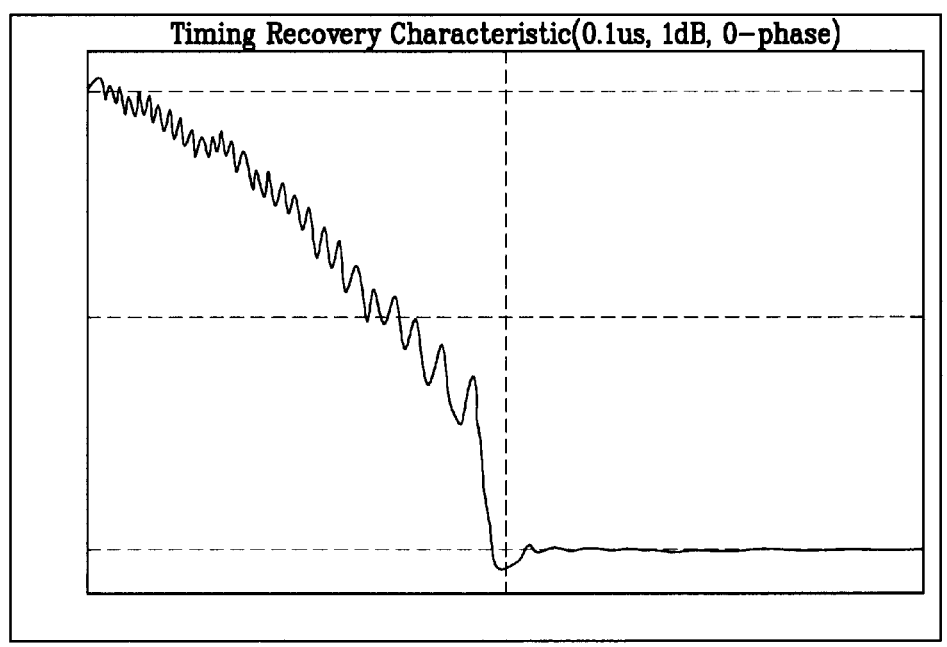

FIGS. 7a and 7b illustrate performance of the symbol timing recovery unit through computer simulation, wherein FIG. 7a illustrates convergence characteristic in a state where no ghost is applied, and FIG. 7b illustrates convergence characteristic in a state where a serious near-by ghost of 1 dB that causes a null at the spectrum edge is applied.

Figure 8:
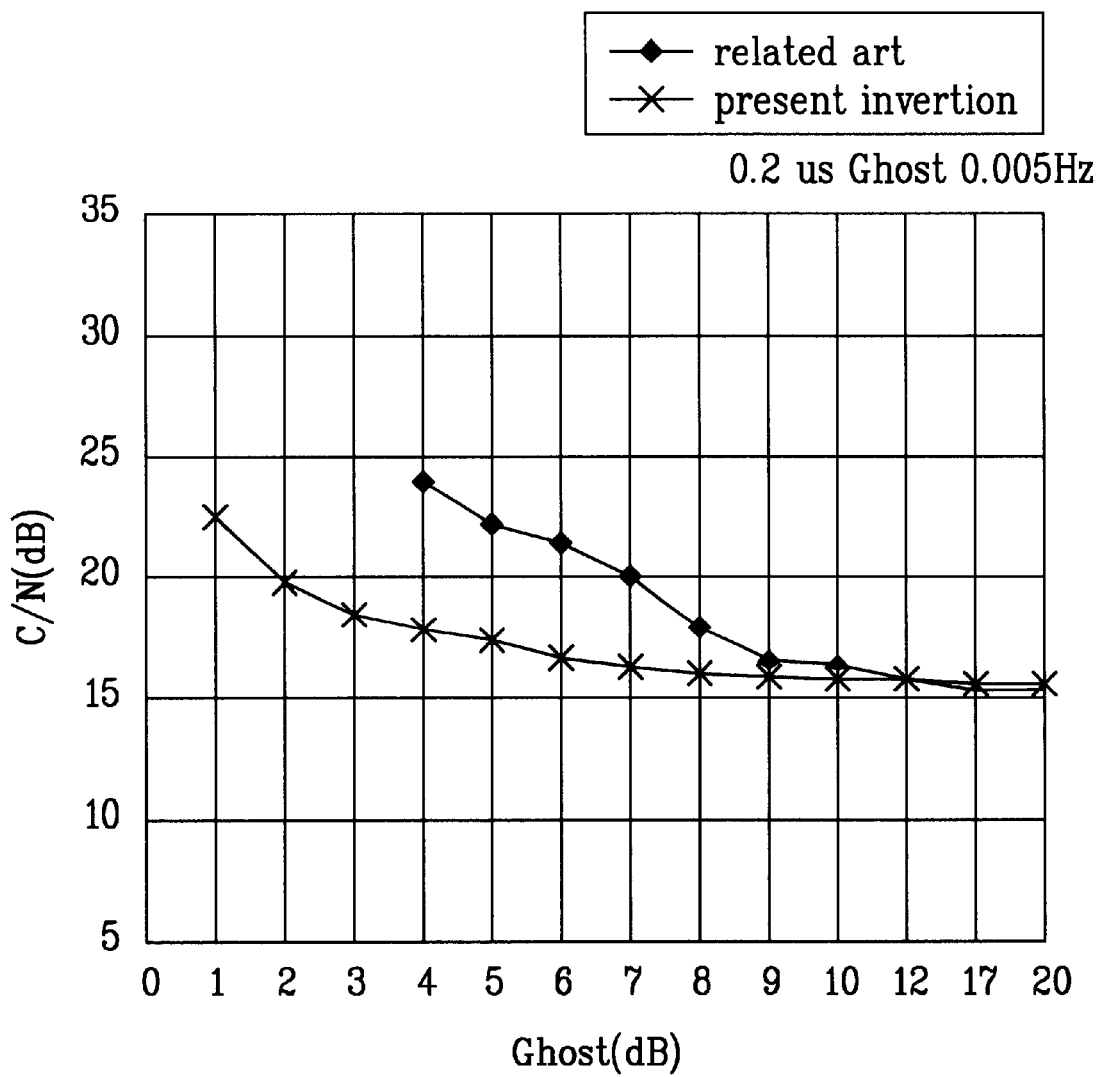
FIG. 8 illustrates the comparison result between the system according to the present invention and the related art system.

FIG. 8 illustrates the comparison result between the system according to the present invention and the related art system. Referring to FIG. 8, it is noted that the near-by ghost can be improved in the present invention.

Since the timing recovery unit 208 of the present invention can obtain timing error without using the segment synchronizing signal, the timing recovery unit 208 can be separated from the synchronizing recovery unit 210.

At this time, the output of the resampler 207 is output to the equalizer 209 through the DC removing unit 306. The equalizer 209 performs equalization to correct either linear distortion of amplitude that causes interference between symbols inserted into the output of the DC removing unit or a ghost generated by reflection of a receiving signal upon building or mountain.

Furthermore, the equalizer 209 removes inter-symbol interference by a multi-path included in the output of the DC removing unit 306. Namely, in the digital transmission system such as HDTV, a bit detection error is caused in a receiving party due to distortion generated as the transmission signal passes through the multi-path channel, interference by an NTSC signal, and distortion by a transceiver system. Particularly, the propagation of a signal through the multi-path causes inter-symbol interference to cause a bit detection error. Accordingly, the equalizer 209 removes the inter-symbol interference.

The output of the equalizer 209 is output to the synchronizing recovery unit 210.

The synchronizing recovery unit 210 can recover the synchronizing signal in many ways. In the present invention, as shown in FIG. 6, the synchronizing signal is recovered using a correlation method based on a variable counter.

Figure 6:
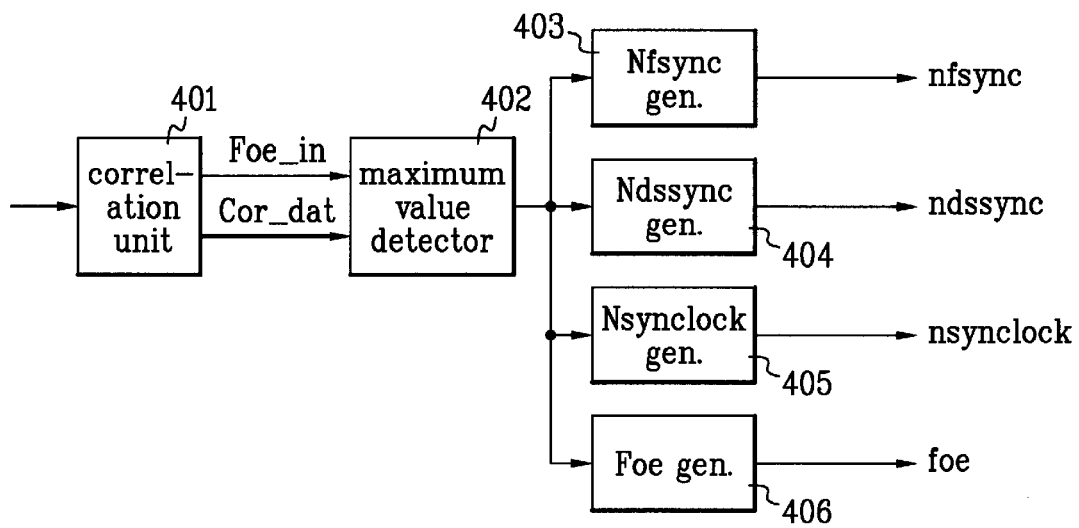
FIG. 6 is a detailed block diagram illustrating a synchronizing recovery unit of FIG. 4.

That is, FIG. 6 shows an example of a detailed block diagram of the synchronizing recovery unit 210. The synchronizing recovery unit 210 includes a correlation unit 401, a maximum value detector 402, a field synchronizing signal generator 403, a segment synchronizing signal generator 404, a synchronizing lock signal generator 405, a Foe signal generator 406, and a VSB mode detector 407.

The correlation unit 401 obtains a correlation value between the VSB signal equalized by the equalizer 209 and a reference field synchronizing signal and outputs the obtained correlation value to the maximum value detector 402. The maximum value detector 402 detects a symbol position value having a maximum correlation value per field and outputs the detected symbol position value to the field synchronizing signal generator 403, the segment synchronizing signal generator 404, the synchronizing lock signal generator 405, and the Foe signal generator 406.

At this time, the correlation unit 401 includes a 512-tap Finite Impulse Response (FIR) filter. The coefficient of the PN511 sequence and a first symbol of the PN63 sequence may be used as the coefficient of the FIR filter. The number of taps of the FIF filter depends on a designer.

If a sign of the input signal of the FIR filter is coincident with a sign of the coefficient of the FIR filter, the correlation value is the greatest. If not so, the correlation value is 0.

The maximum detector 402 compares all the correlation values output from the correlation unit 401 during one field with one another and detects a symbol position value having the greatest correlation value with the field synchronizing signal.

The comparison operation for obtaining the maximum correlation value is implemented in such a manner that a counter is operated by the number of symbols of one field and then a field synchronizing position is searched from a position having a maximum counted value. In other words, correlation values between the VSB signal received per symbol within one field and the field synchronizing signal are compared with each other using the counter indicating the symbol position and a comparator, so that the symbol position having the greatest correlation value is detected and then output to the field synchronizing signal generator 403, the segment synchronizing signal generator 404, the synchronizing lock signal generator 405, and the Foe synchronizing signal generator 406.

The synchronizing signal generator 405 compares the current maximum correlation position value with a previous maximum correlation position value. As a result, if the two values are equal to each other, the synchronizing signal generator 405 transits a signal nsynclock to active low state.

If the signal nsynclock is transited to active low state by the synchronizing lock signal generator 405, the field synchronizing signal generator 403 and the segment synchronizing signal generator 404 obtain position values of the field synchronizing signal and the segment synchronizing signal from the position of the symbol having a maximum correlation value obtained by the maximum value detector 402 in a VSB transmission format, thereby generating a field synchronizing signal nfsync and a segment synchronizing signal ndssync.

Furthermore, the Foe synchronizing signal generator 406 generates odd/even field synchronizing signals from the second PN63 signal sequence. It is normal that the second PN63 of the field synchronizing signal has changed polarity per field. Therefore, the Foe synchronizing signal generator 406 generates a Foe synchronizing signal indicating even/odd fields from the position of the symbol having the maximum correlation value obtained by the maximum value detector 402.

The synchronizing recovery unit 210 recovers the synchronizing signal using the signal having no distortion on the channel, so that the synchronizing signal can stably be recovered even on a channel to which a ghost generating a null in the segment synchronizing signal is applied.

As aforementioned, the digital TV receiver and the method for receiving a digital TV signal according to the present invention have the following advantages.

Elements controlled in an analog mode are processed in a digital mode, and timing recovery and segment synchronizing signal recovery can independently be implemented. This simplifies the system and improves stability and performance of the system, thereby allowing timing recovery and synchronizing signal recovery to be recovered on a channel to which a serious near-by ghost is applied. In particular, in a downtown area or in an area where a VSB terrestrial broadcasting is received through an indoor antenna and a serious near-by ghost signal exists, the synchronizing signal can readily be detected.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A digital TV receiver that receives transmission data in a VSB modulation mode and demodulates the transmission data, the digital TV receiver comprising:

an A/D converter and demodulator converting the VSB modulated signals to digital signals and demodulating the digital signals in the VSB mode;

a resampler performing interpolation to reduce errors between the signals digitalized by the A/D converter and demodulator using a timing error of current symbols;

a timing recovery unit obtaining the timing error of the current symbols from the output of the resampler and outputting again the obtained timing error to the resampler;

an equalizer equalizing a signal included in the output of the resampler using segment and field synchronizing signals as training signals; and a synchronizing recovery unit recovering the segment and field synchronizing signals from the output of the equalizer and outputting again the recovered synchronizing signals to the equalizer.

2. The digital TV receiver of claim 1, wherein the timing recovery unit detects timing error data by multiplying an intermediate sample value by a difference value between signs of two symbol samples.

3. The digital TV receiver of claim 1, wherein the timing recovery unit includes:

a pre-filter that passes through a spectrum edge portion only from the output of the resampler;

a timing error detector that detects timing error data using the signs of the two symbol samples and one intermediate sample that have passed through the pre-filter;

a loop filter that passes through low band signal components only among the timing error data extracted from the timing error detector; and a numerically controlled oscillator (NCO) that controls a sampling timing of the resampler by converting the output frequency in accordance with the low band components of the timing error data.

4. The digital TV receiver of claim 3, wherein the pre-filter is a band pass filter.

5. The digital TV receiver of claim 3, wherein the timing error detector detects timing error data by multiplying an intermediate sample value by a difference value between the signs of the two symbol samples that have passed through the pre-filter.

6. The digital TV receiver of claim 3, wherein the timing error detector detects timing error using the following equation:

$$U_\tau(k) = x\left(\tau - \frac{T}{2} + kT\right)\{x(\tau + kT) - x(\tau - T + kT)\}$$

wherein, $\tau$ is a timing phase, $x(\tau+kT)$ and $x(\tau-T+kT)$ are signs of symbol samples, and $$x\left(\tau - \frac{T}{2} + kT\right)$$

is an intermediate sample.

7. The digital TV receiver of claim 1, further comprising a DC removing unit between the resampler and the equalizer to remove DC components included in the output of the resampler and output the resultant value to the equalizer.

8. The digital TV receiver of claim 1, wherein the synchronizing recovery unit includes:

a correlation unit obtaining a correlation value between the received signal and a preset synchronizing signal;

a maximum value position detector outputting a position value of a symbol having a maximum correlation value per field;

a synchronizing lock signal generator checking reliability of the position value of the symbol detected by the maximum value position detector to generate a synchronizing lock signal; and a synchronizing signal detector detecting a segment synchronizing signal and a field synchronizing signal by obtaining a relative position value of the position value of the symbol having the maximum correlation value if the synchronizing lock signal is generated by the synchronizing lock signal generator.

9. A method for receiving a digital TV signal by receiving transmission data in a VSB modulation mode and demodulating the transmission data, the method comprising the steps of:

a) converting VSB modulated signals to digital signals and demodulating the digital signals in a VSB mode;

b) performing interpolation to reduce errors between the signals digitalized in the step a) using a timing error of current symbols;

c) obtaining the timing error of the current symbols from the output of the step b) and outputting again the obtained timing error to the step b);

d) equalizing a signal included in the output of the step b) using segment and field synchronizing signals as training signals; and e) recovering the segment and field synchronizing signals from the output of the step d) and outputting again the recovered synchronizing signals to the step d).

10. The method of claim 9, wherein the step c) includes the step of detecting timing error data by multiplying an intermediate sample value by a difference value between signs of two symbol samples.

11. The method of claim 9, wherein the step c) further includes the step of passing through a spectrum edge portion only from the output of the step b).

12. The method of claim 9, wherein in the step c), the timing error is detected using the following equation:

$$U_\tau(k) = x\left(\tau - \frac{T}{2} + kT\right)\{x(\tau + kT) - x(\tau - T + kT)\}$$

wherein, $\tau$ is a timing phase, $x(\tau+kT)$ and $x(\tau-T+kT)$ are signs of symbol samples, and $$x\left(\tau - \frac{T}{2} + kT\right)$$

is an intermediate sample.

13. The method of claim 9, wherein the step d) further includes the step of removing DC components included in the output of the step b) to equalize the resultant value.

14. The method of claim 9, wherein the step e) includes the steps of:

e1) obtaining a correlation value between the received signal and a preset synchronizing signal;

e2) detecting a position value of a symbol having a maximum correlation value per field;

e3) checking reliability of the position value of the symbol detected by the step e2) to generate a synchronizing lock signal; and e4) detecting a segment synchronizing signal and a field synchronizing signal by obtaining a relative position value of the position value of the symbol having the maximum correlation value if the synchronizing lock signal is generated by the step e3).

* * * * *